United States Patent [19]

Teyssie et al.

[11] Patent Number: 5,670,592
[45] Date of Patent: Sep. 23, 1997

[54] SYSTEM FOR PRIMING THE ANIONIC POLYMERIZATION OF ALKYL METHACRYLATE

[75] Inventors: Philippe Teyssie, Neuville en Condroz, Belgium; Bruno Vuillemin, Pau, France; Jinshan Wang, Naperville, Ill.

[73] Assignee: Elf Atochem S.A., Puteaux, France

[21] Appl. No.: 519,398

[22] Filed: Aug. 25, 1995

[30] Foreign Application Priority Data

Aug. 24, 1995 [FR] France ............................ 94 10288

[51] Int. Cl.[6] ......................................... C08F 4/52
[52] U.S. Cl. ........................ 526/177; 502/104; 502/123; 502/157; 526/173; 526/180; 526/185; 526/319; 526/328; 526/329.7

[58] Field of Search ..................... 526/177, 173, 526/180, 329.7, 319; 502/123, 104, 157

[56] References Cited

PUBLICATIONS

Andrews et al., *Macromolecules*, (1981), 14, 1599.
Hatada et al. *Makromol. Chem. Suppl.*, (1989), 15, 167.

*Primary Examiner*—Fred Zitomer
*Attorney, Agent, or Firm*—Burns, Doane, Swecker & Mathis, L.L.P.

[57] ABSTRACT

The invention concerns the anionic polymerization of alkyl methacrylate in the presence of a priming system. The priming system comprises an organolithium primer and an organic compound of aluminum and pyridine. This priming system allows better polymerization control.

13 Claims, No Drawings

SYSTEM FOR PRIMING THE ANIONIC POLYMERIZATION OF ALKYL METHACRYLATE

The invention under consideration concerns a new priming system for anionic polymerization of alkyl methacrylate, said system making it possible to accomplish polymerization at temperatures higher than those normally used. Thus, the invention thus concerns a polymerization process using this priming system.

Conventional practice encompasses the preparation of alkyl polymethacrylates, and, in particular, of methyl polymethacrylate, by means of anionic polymerization in the presence of a priming system comprising a primer and a ligand. The presence of a ligand is generally necessary to avoid secondary reactions resulting from anion attack of ester groups of the alkyl methacrylate monomer. In this way, it is possible to control more effectively the polymerization of the alkyl methacrylate and, therefore, to obtain more effective priming, a narrower distribution of molecular masses, and quantitative conversion.

However, the priming systems described require that polymerization take place at very low temperatures. Accordingly, in Patent No. EP-A-185641, the priming system comprises an organic alkaline metal compound as the primer and a mineral alkaline metal salt (lithium chloride) as the ligand, and polymerization of the methyl methacrylate normally occurs at −78° C.

Furthermore, the use as a ligand of organic aluminum compounds, for example of trialkylaluminums, using t-butyllithium as the primer, has been described. Polymerization in toluene takes place at −78° C. (Hatada et al., *Makromol. Chem. Suppl.*, 1989, 15, 167).

Andrews et al., in *Macromolécules*, 1981, 14, 1599, describes the anionic polymerization of methyl methacrylate at higher temperatures, i.e., at 0°–45° C., in the presence of organolithium primers such as s-BuLi, when pyridine is used as solvent or co-solvent (pyridine/toluene). The complex formed between the s-BuLi and the pyridine is an active one which is highly important for the formation of the living polymer. However, this complex is not stable and undergoes decomposition reactions either when the temperature increases or when the quantity of pyridine in the solvent mixture decreases. The result is a decreased priming effectiveness and, therefore, poorly-controlled polymerization of methyl methacrylate.

To allow industrial-scale use, anionic polymerization must take place at higher temperatures, i.e., at least equal to 0° C.

Accordingly, the present invention concerns a priming system for the anionic polymerization of alkyl methacrylate, and, in particular, of methyl methacrylate, said system making it possible to carry out polymerization under industrial-scale conditions, i.e., at temperatures at least equal to 0° C., but without causing the aforementioned problems; that is, by allowing enhanced control of polymerization.

The priming system according to the invention allowing anionic polymerization of methyl methacrylate comprises an organolithium primer and pyridine, and it is characterized by the fact that it further comprises an organic aluminum compound, advantageously corresponding to the formula:

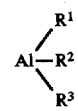

in which $R^1$ to $R^3$ are substituted or unsubstituted alkyl groups, either branched or unbranched, having 1 to 6 carbon atoms, or substituted or unsubstituted phenoxy groups.

As the alkyl group, $R^1$ to $R^3$ may, for example, represent methyl, ethyl or isopropyl groups.

As possible substituents of the phenoxy groups, mention may be made of groups such as inferior alkyl and aryl. Alkyl group substituents include, for example, aryl groups.

Examples of aluminum compounds that can be used according to the invention are triethylaluminum, di-(2-6-di-tert-butylphenoxy)ethyl (or methyl or -isobutyl) aluminum and tri-(2-6-di-tert-butylphenoxy) aluminum.

A primer usable according to the invention has the formula R—Li, where R signifies:

- a branched or unbranched alkyl radical containing 1 to 6 carbon atoms, potentially replaced by at least one aryl or alkyl group, or
- a potentially-substituted, mono- or multicyclic aryl radical, or
- an alkenyl radical at $C_2$–$C_6$ replaced by an aryl, alkyl, or alkylaryl group.

Use may also be made of any other known primer in the anionic polymerization of methacrylates.

Examples of primers include sec-butyllithium, n-butyllithium, tert-butyllithium, fluorenyllithium, alphamethylstyryllithium, 1,1-diphenylhexyllithium, diphenylmethyllithium, and 1,1-diphenyl-3-methylpentyllithium. Lithium diisopropylamide and alpha-lithioisobutyrate may also be used.

The term alkyl methacrylate signifies methacrylates in which the alkyl group, replaced as needed, for example, with at least one atom of halogen, contains 1 to 18 carbon atoms; these methacrylates include methyl, ethyl, 2,2,2-trifluorethyl, n-propyl, isopropyl, n-butyl, sec-butyl, tert-butyl, n-amyl, i-amyl, hexyl, ethyl-2-hexyl, cyclohexyl, octyl, i-octyl, and decyl methacrylates.

The mole ratio of the aluminum compound to the primer in the priming system may vary within very broad limits. The quantity of aluminum compound may, for example, substantially exceed the quantity of priming agent. Use is preferably made of a mole ratio of aluminum compound to primer of at least 1 and at most 50, and, more particularly, from 1 to 10.

Pyridine may be mixed with another solvent, preferably a nonpolar solvent, such as benzene, ethylbenzene, and toluene. The solvent mixture preferably contains at least 10% pyridine by volume.

The present invention also concerns a process for the anionic polymerization of alkyl methacrylate, in which the alkyl methacrylate is polymerized at a temperature of at least 0° C. in the presence of a priming system, such as those previously described.

The priming system according to the invention, which comprises an organolithium primer and an aluminum organic compound combined with pyridine used as solvent, mixed or unmixed with another solvent, allows polymerization of alkyl methacrylate which is effectively controlled at higher temperatures than those normally used. The temperature may be at least 0° C., and may reach 20° C. or more without posing any real problem.

According to one embodiment of the invention, the priming system is prepared by adding the aluminum compound to the pyridine; then, the desired quantity of primer is added (method A). According to another embodiment, the aluminum compound is first mixed with the primer, then the pyridine is added to the mixture (method B). According to yet another method, the primer is mixed with the pyridine before adding the aluminum compound (method C).

Method A is preferred in order to obtain priming effectiveness approximating 1 and a relatively narrow distribution of molar masses.

Polymerization length depends, in particular, on the monomer and primer concentrations and on the polymerization temperature.

Polymerization is carried out in the absence of moisture and oxygen.

Using the procedure according to the invention, it is possible to obtain methyl polymethacrylates having a number-average molar mass falling generally between 5,000 and 500.000, with a polymolecularity which may vary between 1.05 and 1.6. Priming effectiveness may be very high, i.e., greater than 0.90.

To obtain poly(methyl) methacrylate from living poly (methyl methacrylate), the latter is deactivated by reacting it with a proton source consisting mainly of an alcohol or an acid.

The living poly(methyl methacrylate) according to the invention may, by sequenced copolymerization or anionically, yield block copolymers comprising at least one poly(methyl methacrylate)based block prepared using the process according to the invention, and one or several identical or different blocks, each containing a polymer other than poly(methyl methacrylate). The monomers intended for the additional block(s) may be selected from acrylic, methacrylic, vinylaromatic, and diene-containing monomers and maleimides.

The following non-limiting examples illustrate the invention. In these examples, the following abbreviations are used:

DPHLi: 1,1-diphenylhexyllithium
MAM: methyl methacrylate
$ET_3Al$: triethylaluminum
PstLi+: polystyryllithium
tBuLi: tert-butyllithium
sBuLi: sec-butyllithium
nBuLi: n-butyllithium.

MAM is dried under reflux on $CaH_2$, distilled under reduced pressure, and stored at $-20°$ C. under an inert atmosphere.

Pyridine is heated to reflux on KOH, then distilled on the $PSt^-Li^+$ oligomer.

The DPHLi primer is prepared at 30° C. by reacting diphenylethylene on n-BuLi in toluene for 48 hours.

Examples 1–7 relate to polymerization of MAM in the presence of the priming system ($Et_3Al$+pyridine) DPHLi, prepared using method A as described above.

Examples 8 and 9 are comparative examples. In Example 8, the priming system contains no $Et_3Al$, while in Example 9, the priming system contains no pyridine.

Table 1 gives the conversion rate, the average molar mass as calculated ($\overline{Mn}$ cal) and as actually obtained ($\overline{Mn}$ sec), the polymolecularity ($\overline{Mw}/\overline{Mn}$), and the priming effectiveness (f).

$\overline{Mn}$ cal=conversion×weight of the monomer (g)/C.primer (mole)

(f)=$\overline{Mn}$ cal/$\overline{Mn}$ sec.

Steric exclusion chromatography (sec) was carried out in tetrahydrofuran, using the Hewlett-Packard 1037A apparatus equipped with a refraction index detector.

EXAMPLES 1–4

In these examples, use was made of a priming system prepared using method A; that is, the aluminum compound ($Et_3AL$) was added to dried pyridine. After 10 minutes, the desired quantity of primer (DPHLi) was added to the mixture. The aluminum compound/primer mole ratios are given in Table 1. The mixture was prepared at 0° C. It should be noted that, in these examples in which the priming system is said to be formed from pyridine used as the sole solvent, the priming system solution always contained toluene in a proportion of approximately 2% by volume, since DPHLi and $ET_3Al$ were used in solution in the toluene.

Polymerization of the MAM took place in a glass flask preliminarily exposed to flame. $4 \times 10^{-3}$ mole/liter of the priming system was fed into the flask using a syringe, and the MAM was added at 0° C. The MAM was preliminarily treated with a 10% $Et_3Al$ solution in toluene at 0° until a persistent greenish-yellow color was obtained; it was then distilled under reduced pressure. The MAM polymerization time for each example is given in Table 1.

The products were collected by precipitating out the polymerization solution in heptane and dried at 60° C. in a vacuum for 48 hours.

EXAMPLES 5 and 6

The procedures used in Examples 1 to 4 were repeated. However, a mixture of pyridine and toluene was used. Table 1 shows the quantities of the various compounds, the polymerization conditions, and the results.

EXAMPLE 7

The operating procedure used in Examples 1 to 4 was repeated, but the MAM polymerization temperature was 20° C.

It may be noted that, at this temperature, conversion was quantitative and priming effectiveness was still approximately one. Polymolecularity was only 1.30.

EXAMPLE 8

(control)

The procedure used in Examples 1 to 4 was repeated, but the priming system contained no $Et_3Al$.

EXAMPLE 9

(control)

The operating method implemented in Examples 1 to 4 was repeated, but no pyridine was used.

Table 1 shows that the presence of the $Et_3Al$ ligand was essential for controlling the living nature of the polymer. In the absence of the aluminum compound (Example 8), polymerization was not adequately controlled, as demonstrated by the low priming effectiveness (f=0.22) and a bimodal distribution of molar masses (Mw/$\overline{Mn}$=1.75), thus indicating the simultaneous existence of two active types.

It may also be seen that, in the absence of pyridine (example 9), priming effectiveness was low and polymolecularity high.

Table 1 shows that well-control MAM polymerization at temperatures higher than 0° C. resulted from the combination of the primer, the aluminum compound, and the pyridine.

compound, (b) pyridine, and (c) an organoaluminum compound.

TABLE 1

| | | | Et3Al/DPHLi Priming System | | | | | | | |
|---|---|---|---|---|---|---|---|---|---|---|
| Ex. | MAM (mol/l) | Py./Tol. (v/v) | Et₃Al/DPHLi (mol/mol) | Temp. (°C.) | Time (h) | Conversion (wt %) | $\overline{Mn}$ cal | $\overline{Mn}$ sec | Mw/$\overline{Mn}$ (sec) | (f) |
| 1 | 0.40 | 50/0 | 2/1 | 0 | 3 | 100 | 10,000 | 10,400 | 1.40 | 0.96 |
| 2 | 0.80 | 50/0 | 5/1 | 0 | 3 | 100 | 20,000 | 21,500 | 1.09 | 0.93 |
| 3 | 0.225 | 50/0 | 5/1 | 0 | 3 | 98 | 5,620 | 5,870 | 1.10 | 0.96 |
| 4 | 0.60 | 50/0 | 5/1 | 0 | 3 | 100 | 15,000 | 16,500 | 1.08 | 0.91 |
| 5 | 0.40 | 35/15 | 5/1 | 0 | 2 | 99 | 10,000 | 11,500 | 1.12 | 0.96 |
| 6 | 0.386 | 5/45 | 5/1 | 0 | 1.5 | 100 | 9,650 | 10,200 | 1.60 | 0.95 |
| 7 | 0.396 | 50/0 | 5/1 | 20 | 1.5 | 100 | 9,900 | 10,000 | 1.30 | 0.99 |
| 8 | 0.48 | 50/0 | DPHLi | 0 | 0.5 | 100 | 12,000 | 54,400 | 1.75 | 0.22 |
| 9 | 0.44 | 0/50 | 5/1 | 0 | 0.5 | 100 | 5,500 | 42,800 | 2.50 | 0.13 |

EXAMPLE 10

The operating method applied in Example 3 was repeated, but the Et₃Al aluminum compound was first mixed with the DPHLi primer for about 10 minutes, then the pyridine was added to the mixture (method B). The results are recorded in Table II.

EXAMPLE 11

The method used in Example 3 was repeated. However, in this case the DPHLi primer was first mixed with pyridine for 30 minutes, then the Et₃Al aluminum compound was added to the DPHLi/pyridine solution (method C).

The results are given in Table II.

Table II indicates that anionic polymerization also depends on the process used to prepare the primer/aluminum compound/pyridine priming system according to the invention. Nevertheless, priming effectiveness remained high.

2. The initiator composition as defined by claim 1, comprising (a) an organolithium compound, (b) pyridine, and (c) an organoaluminum compound having the formula:

wherein $R^1$ to $R^3$ are each a branched or unbranched alkyl radical having from 1 to 6 carbon atoms and substituted or unsubstituted by an aryl group, or wherein $R^1$ to $R^3$ may be a phenoxy group, substituted or unsubstituted by a lower alkyl or aryl group.

3. The initiator composition as defined by claim 1, wherein the organoaluminum compound comprises triethylaluminum, di-(2-6-di-tert-butylphenoxy)-ethyl, or methyl or isobutyl, aluminum, or tri-(2-6-di-tert-butylphenoxy) aluminum.

TABLE 1

| | | | ET3Al/DPHLi Priming System | | | | | | | |
|---|---|---|---|---|---|---|---|---|---|---|
| Ex. | Method | MAM (mol/l) | Et₃Al/DPHLi (mol/mol) | Temp. (°C.) | Time (h) | Conversion (wt %) | $\overline{Mn}$ cal | $\overline{Mn}$ sec | Mw/$\overline{Mn}$ (sec) | (f) |
| 3 | A | 0.225 | 5/1 | 0 | 3 | 100 | 5,620 | 5,870 | 1.10 | 0.96 |
| 10 | B | 0.563 | 5/1 | 0 | 1 | 96 | 13,500 | 17,300 | 1.52 | 0.78 |
| 11 | C | 0.339 | 5/1 | 0 | 1 | 98 | 8,300 | 9,300 | 1.40 | 0.90 |

EXAMPLE 12

The same procedure used in Example 3 was repeated, but the DPHLi primer was replaced with t-BuLi. Conversion was 100%. The $\overline{Mn}$ cal was 25,000, Mw/$\overline{Mn}$ polymolecularity was 1.12, and priming effectiveness was 0.65.

EXAMPLES 13 and 14

The procedure used in Example 3 was repeated, but the t-BuLi was replaced with s-BuLi and n-BuLi, respectively. A polymer having a calculated $\overline{Mn}$ of 15,000 was obtained. Polymolecularity was approximately 1.30, and effectiveness less than 0.60.

What is claimed is:

1. An initiator composition for the anionic polymerization of an alkyl methacrylate, comprising (a) an organolithium 4. The initiator composition as defined by claim 1, said organolithium compound having the formula R—Li, wherein R is a branched or unbranched alkyl radical having from 1 to 6 carbon atoms, optionally substituted by at least one aryl or alkyl radical, an optionally substituted mono- or multicyclic aryl radical, or a $C_2$–$C_6$ alkenyl radical optionally substituted by an aryl, alkyl or alkylaryl radical.

5. The initiator composition as defined by claim 1, said organolithium compound comprising sec-butyllithium, n-butyllithium, tert-butyllithium, fluorenyllithium, alphamethylstyryllithium, 1,1-diphenylhexyllithium, diphenylmethyllithium, and 1,1-diphenyl-3-methylpentyllithium.

6. The initiator composition as defined by claim 1, said organolithium compound comprising lithium diisopropylamide or alpha-lithioisobutyrate.

7. The initiator composition as defined by claim 1, comprising the combination of pyridine with a nonpolar solvent.

8. The initiator composition as defined by claim 7, said nonpolar solvent comprising benzene, ethylbenzene or toluene.

9. The initiator composition as defined by claim 7, wherein the pyridine/nonpolar solvent mixture contains at least 10% pyridine by volume.

10. The initiator composition as defined by claim 1, wherein the aluminum compound/primer mole ratio ranges from 1 to 50.

11. A process for the anionic polymerization of an alkyl methacrylate in the presence of an initiator composition therefor, comprising polymerizing said alkyl methacrylate at a temperature of at least 0° C. in the presence of an initiator composition as defined by claim 1.

12. The process as defined by claim 11, comprising polymerizing an alkyl methacrylate, the alkyl group of which is either unsubstituted or substituted by at least one halogen atom and which contains 1 to 18 carbon atoms.

13. The process as defined by claim 12, said alkyl methacrylate comprising methyl methacrylate.

* * * * *